UNITED STATES PATENT OFFICE.

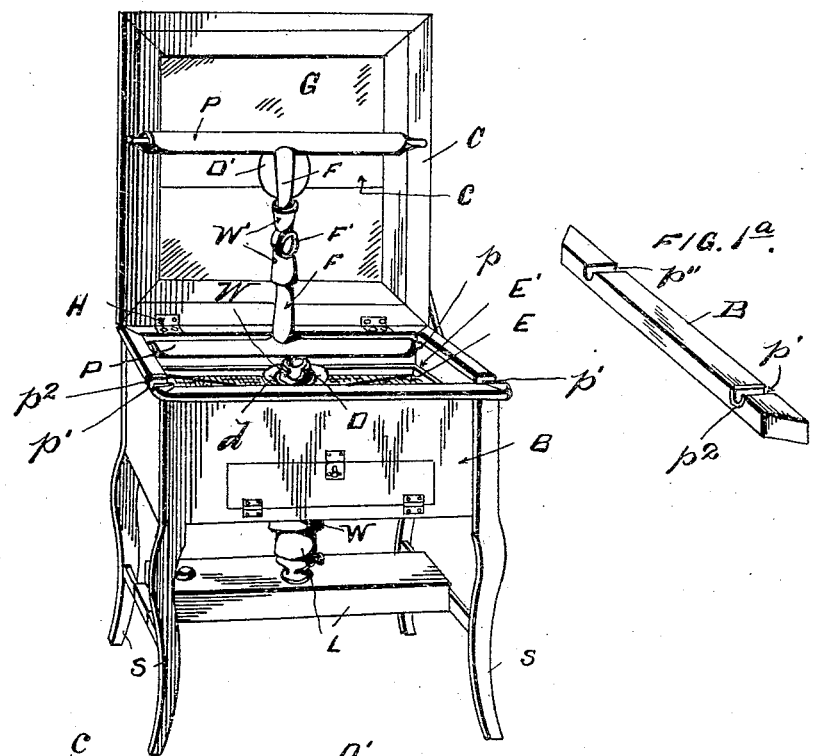
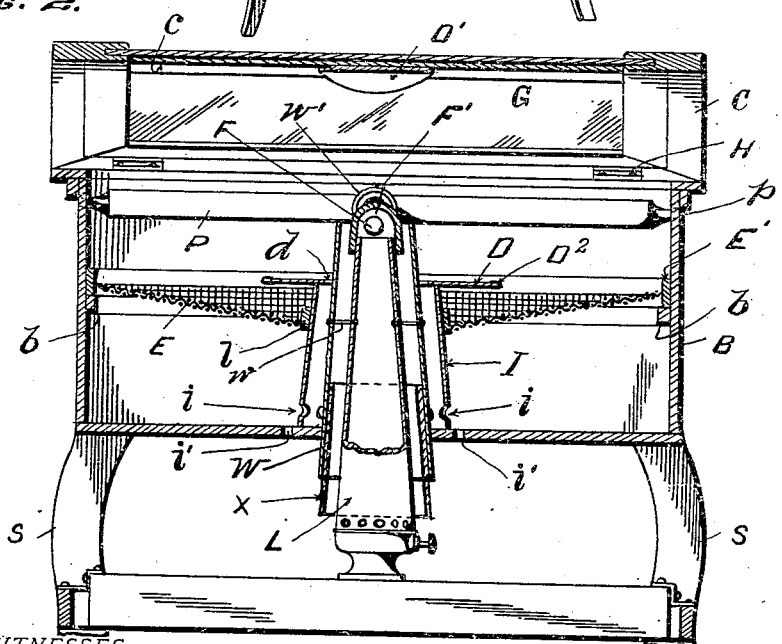

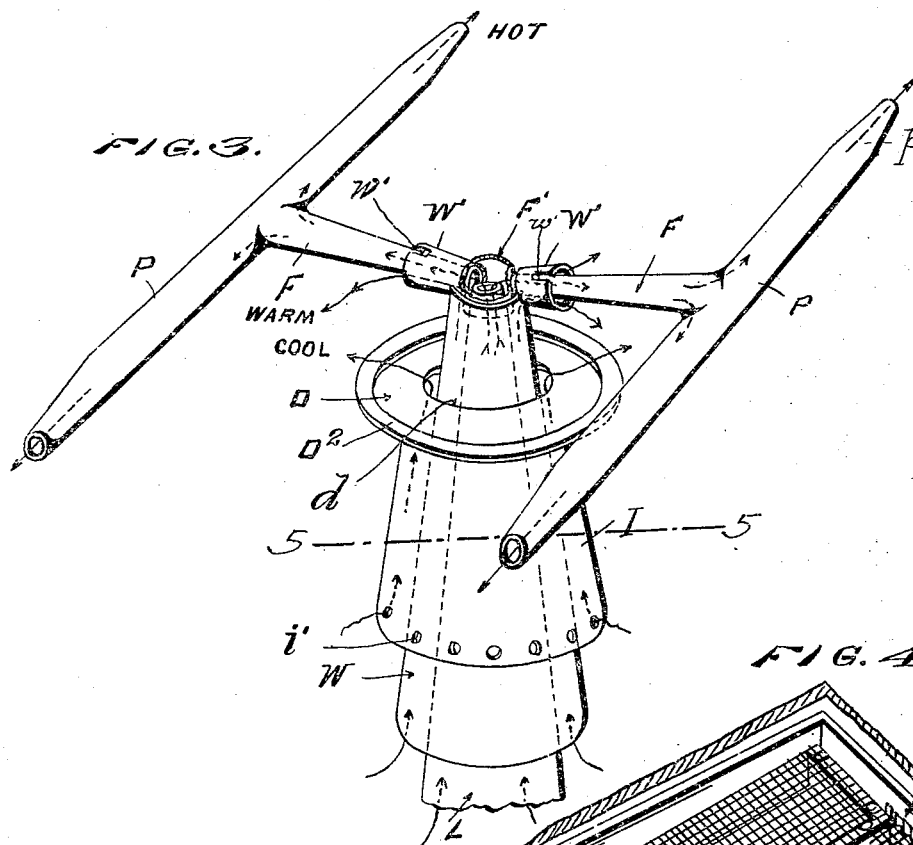
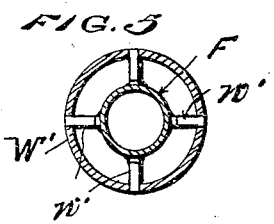
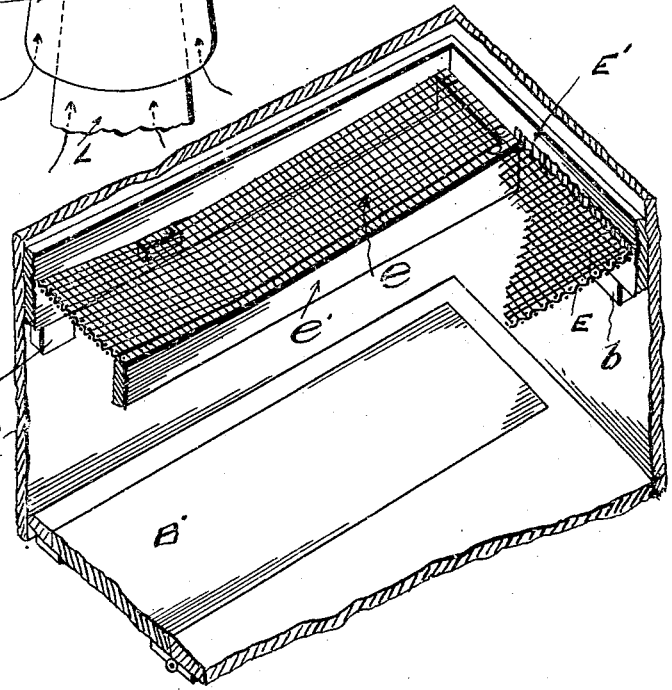

LOUIS N. PORTER, OF BLAIR, NEBRASKA, ASSIGNOR TO THE RAYO INCUBATOR COMPANY, OF BLAIR, NEBRASKA, A CORPORATION OF NEBRASKA.

INCUBATOR.

956,600.  Specification of Letters Patent.  Patented May 3, 1910.

Application filed February 7, 1908. Serial No. 414,799.

*To all whom it may concern:*

Be it known that I, LOUIS N. PORTER, a citizen of the United States, and resident of Blair, Washington county, State of Nebraska, have invented certain new and useful Improvements in Incubators; and my preferred manner of carrying out the invention is set forth in the following full, clear, and exact description, terminating with claims particularly specifying the novelty.

This invention relates to the care of live stock, and more especially to that class of devices thereunder known as incubators; and the object of the same is broadly to improve the heating system therefor, and specifically to improve certain other details to be used in connection therewith.

To this end the invention consists broadly in a centrally located source of heat (here shown as a lamp) and an H-shaped heater hinged within the incubator body or casing, receiving its heat from said lamp, and radiating it to and through the corners of the casing.

The invention also consists of other details as will be hereinafter set forth, all as shown in the accompanying drawings in which—

Figure 1 is a perspective view of an incubator with my improvements attached, the cover being raised and the hinged heater shown as turned back so as to permit access to the egg tray. Fig. 1ª is a perspective detail of one of the upper side bars of the body showing two notches and one of them lined with a cushion. Fig. 2 is a central vertical section of the same showing the heater as lowered and the cover as being lowered. This view also shows a slight amplification as described below. Fig. 3 is a perspective detail of the lamp and all the various flues, some of which are partly broken away. Fig. 4 is a detail of the egg tray. Fig. 5 is a section on the line 5—5 of Fig. 3, omitting the cold air flue.

Referring to the drawings, the letter B designates the body or casing of the incubator or brooder mounted on legs or supports S, and L is the source of heat (here shown as a lamp) supported by said supports beneath the body with its chimney extending upward into the latter as shown. The egg tray E is supported at its edges on cleats $b$ within the body and is dished or inclined slightly toward its center where it surrounds the heater, and is here provided with an upstanding ring or collar $l$ which may surround the cold air cylinder I hereinafter described and afford an additional support for the egg tray. The latter is preferably held within a frame E′ across which near the front is fixed a strip $e'$ to which the wire netting forming the filling material of the body E of the egg tray is attached, but forward of which is an individual strip of wire netting $e$, also dished, and resting on one cleat $b$ and the strip $e'$ as best seen in Fig. 4.

B′ designates a door in the bottom of the casing B below the individual strip in the egg tray, and when the chicks hatch the strip $e$ is removed and the door is opened so that the chicks may descend to the nursery below, which is not shown in the present application.

The letter C designates the cover of the casing which in the present instance is hinged as at H to one edge of the body and has glass panels G within a suitable framework, and possibly a central transverse strip $c$, as of wood, which latter may support a diaphragm D′ adapted to stand immediately above the heater so as to prevent the breaking of the glass. However, all these details cover my preferred construction rather than being necessary.

The lamp chimney L or an extension thereof forming the main flue projects upward through the bottom of the casing B at its diametrical center as best seen in Fig. 2, and communicates with the open lower end of a hood F′ which is intended to fit rather closely thereover. From this hood the main branch flues F project in opposite directions, preferably rising slightly and growing larger toward their outer ends, and the latter communicate with the centers of the two flues P which stand parallel with each other and about horizontal—said heating flues F and P thereby constituting the heater and having the shape of an H when viewed from above. By preference the outer extremities of the parallel flues P are reduced or provided with nipples $p$, those standing nearest the hinges H passing loosely through holes in the sides of the body or casing and forming a hinge or pivot for the entire heater, and those on the other flue P loosely entering notches in the sides of the casing near its front as at $p'$, cushions $p^2$ being provided as a lining within the notches so as to cause them to receive these nipples without jarring the eggs. Thus the products of combustion rising from the lamp, pass into the hood F', thence outward through the main branch flues F, thence outward through the four arms of the two parallel flues P, and find their exit out the four nipples—having risen to a point near the cover and then radiated to and through the corners of the casing— and if the hood fit the upper end of the lamp chimney rather tight, none of the direct products of combustion will escape into the hatching chamber. Next outside the main flue L is a tube W concentric with and spaced from it and forming the warm air flue. This tube extends through a hole in the bottom of the casing, upward to a point about even with the top of the main flue L where it is notched in its upper end so as to receive the warm air branch flues W' which loosely surround the main branch flues F and extend outward for a short distance as shown. Any suitable means may be devised for holding the parts in their proper position, but I prefer bolts $w$ connecting the tubes L and W, and the branch flues W' may well be mounted on those lettered F by cutting from the former small tongues $w'$ and bending them inward so as to engage the flues F as seen in Fig. 5. Hence when the entire heater is raised about its pivots $p$, the warm air branch flues W' rise with it; and when it is lowered they drop again into position within the notches in the upper end of the warm air flue W.

In Fig. 2 is illustrated an amplification of or addition to the warm air flue W which may sometimes be employed. This consists of an extension X which may be telescoped into or otherwise adjustably connected with its lower end, so that it may be removed entirely as when shipping the machine or when not needed, or may be put in place and adjusted higher or lower so as to collect more or less of the heat radiating from the main flue L. The outside air enters the lower end of this extension or the flue W, passes up between it and the main flue L and is thereby warmed, passes into and through the warm air branch flues W' wherein it is further warmed, and is finally delivered into the hatching chamber devoid of any of the products of combustion, and escapes slowly through the holes $p$ and notches $p'$. Next outside the warm air flue is another tube I surrounding that lettered W and spaced from it so as to produce a cold air flue, this tube being perforated as at $i$ near its lower end which rests upon the bottom of the casing, and the latter being perforated at $i'$ at adjacent points as shown. Cold air from the outside passes through perforations $i'$ into the casing, is then drawn into the tube I by the draft through perforations $i$, and finally passes upward through the cold air flue I within which its chill will be removed but it will not be perceptibly heated by the tube W, and is delivered into the hatching chamber. By preference the collar at the center of the egg tray is supported in any suitable manner upon this cold air tube I as indicated. By preference also I employ an asbestos diaphragm D having a central aperture $d$ smaller than the upper end of the tube I and a peripheral frame $D^2$ for holding it substantially flat. This diaphragm rests upon the upper end of the cold air flue which it nearly closes, and stands between the center of the heater and the depressed center of the egg tray so that the heat where it is greatest may not have an injurious effect upon the eggs.

After the cover C has been raised and the heating flues turned back as shown in Fig. 1, the diaphragm can be lifted off to permit ready access to all the eggs upon the egg tray; and the latter is also made of such depth that it may be lifted out of place when the parts stand as seen in Fig. 1. It is quite possible that the rearmost nipples $p$ could rest in notches $p''$ like those lettered $p'$ (see Fig. 1ª) so that the heater could be swung back as shown or could be lifted out entirely as for cleaning or repair. The lamp can be regulated manually from the exterior of the body as is clear, and a thermostat might be added without departing from the spirit of my invention.

The parts are of the desired proportions and materials, and changes in details may be made at the will of the manufacturer. It is even possible to use the H-shaped heater in connection with some other source of heat and without both or either of the warm air and cold air flues, and obviously the shape of the egg tray and the use of the diaphragm are matters of preference rather than necessity in connection therewith. But by preference, when the heat rises at the center of a rectangular casing, the netting composing the body of the egg tray is depressed from the corners toward the middle of each side and again from all edges toward the center of the tray. This is done because of the well known tendency of heat to rise, and as the source of heat is at the center of the tray that point would be unduly heated if it were not depressed and protected by the diaphragm. By the construction above the products of combustion are passed through the nipples to points entirely outside the hatching chamber, but the air currents admitted through the flues W and I commingle within said chamber, maintain a constant and average temperature therein as would the feathers of the mother hen, and escape slowly through the holes or notches around said nipples; whereas when the cover is raised from time to time, a fresh supply of air is admitted, as would occur when the hen left her nest. Thus the machine produces ideal artificial incubation following the natural process closely.

What is claimed as new is:

1. In an incubator, the combination with a substantially rectangular casing having outlets through its sides near its corners, supports therefor, a hinged cover, and an egg tray within the casing between its cover and bottom; of a source of heat exterior to the casing and having a main flue rising through the center of its bottom and through said egg tray, a heater movably supported by the body of the casing and comprising flues of substantially H-shape whose extremities lead to said outlets, and connections between said main flue and the heater.

2. In an incubator, the combination with a casing having outlets through its sides near its corners, a cover therefor, and an egg tray within the casing between its cover and bottom; of a source of heat having a main flue rising through the bottom of the casing and the center of the egg tray, and an H-shaped heater disconnected from the cover and having a central hood detachably communicating with the upper end of said flue and its extremities communicating with said outlets.

3. In an incubator, the combination with a casing having outlets near its corners, supports therefor, a cover, and an egg tray within the casing between its cover and bottom; of a source of heat having a main flue rising through the bottom of the casing and the center of the egg tray, and an H-shaped heater having a central hood detachably communicating with the upper end of said flue, the extremities of one of its parallel arms pivotally engaging two of said outlets and the extremities of the other arm movably engaging the remaining outlets.

4. In an incubator, the combination with a substantially rectangular casing having holes through its sides near its rear corners and notches in the upper edges of its sides near its front corners, a cover hinged to the casing, and an egg tray therein; of a source of heat having a main flue rising centrally within the casing, and an H-shaped heater having a hood detachably communicating with said flue and four extremities of which two are journaled in said holes and the others normally rest in said notches.

5. In an incubator, the combination with a substantially rectangular casing having holes through its sides near its rear corners and notches in the upper edges of its sides near its front corners, cushions within said notches, a cover hinged to the casing along its rear, and an egg tray; of a source of heat having a main flue rising centrally within the casing, an H-shaped heater detachably communicating with said flue, and reduced nipples in its four extremities of which two are journaled in said holes and the others normally rest in said notches.

6. In an incubator, the combination with a casing having outlets near its corners, a cover, and an egg tray within the casing between its cover and bottom; of a source of heat having a main flue rising through the bottom of the casing and the center of the egg tray, an H-shaped heater having a central hood detachably communicating with the upper end of said flue and main branch flues leading to parallel flues whose extremities loosely engage said outlets, a warm air flue rising through the bottom of the casing around said main flue, and warm air branch flues surrounding and mounted upon the main branch flues of said heater near its hood.

7. In an incubator, the combination with a casing having notches near its corners, a cover, and an egg tray within the casing between its cover and bottom; of a source of heat including a main flue rising through the bottom of the casing and the center of the egg tray, an H-shaped heater movable independently of the cover and having a central hood detachably communicating with said flue and its extremities loosely engaging said notches, a warm air flue rising through the bottom of the casing around said main flue and notched in its upper end, and warm air branch flues surrounding and mounted upon said heater near its hood, supported by and movable with it, and resting in said notches when the heater is lowered.

8. In an incubator, the combination with a casing having outlets, and a heater having a central hood and flues leading thence to and loosely through said outlets; of a source of heat having a main flue rising within the casing and communicating with said hood, a warm air flue rising through the bottom of the casing and surrounding said main flue, warm air branches surrounding the heater flues adjacent its hood and communicating at their inner ends with said warm air flue, and an extension at the lower end of the latter adjustable from the exterior of the casing.

9. In an incubator, the combination with a casing having outlets, an egg tray, and a heater having a central hood and flues leading thence to and through said outlets and loosely supported therein; of a source of heat having a main flue rising within the casing and detachably communicating with said hood, a warm air flue rising through the bottom of the casing and surrounding said main flue, warm air branches fixedly surrounding the heater flues adjacent said hood and detachably communicating at their inner ends with said warm air flue, and a cold air flue surrounding the warm air flue and spaced from it, and admitting cold air at its lower end.

10. In an incubator, the combination with a casing having outlets, an egg tray, and a heater having a central hood and flues leading thence to and through said outlets; of a source of heat having a main flue rising within the casing and communicating with said hood, a warm air flue rising through the bottom of the casing and surrounding said main flue, warm air branches surrounding the heater flues adjacent its hood and communicating at their inner ends with said warm air flue, a cold air flue surrounding the warm air flue and spaced from it, and a diaphragm supported by the cold air flue between said heater and egg tray.

11. In an incubator, the combination with a casing having outlets, an egg tray, and a heater having a central hood and flues leading thence to and through said outlets and loosely supported therein; of a source of heat having a main flue rising within the casing and detachably communicating with said hood, a warm air flue rising through the bottom of the casing and surrounding said main flue, warm air branches fixedly surrounding the heater flues adjacent its hood and detachably communicating at their inner ends with said warm air flue, an adjustable extension at the lower end of the warm air flue, a cold air flue surrounding the warm air flue and spaced from it, and a diaphragm supported by the cold air flue between said heater and egg tray and having a central aperture.

12. In an incubator, the combination with a casing having outlets through its sides near its top, a cover therefor, a diaphragm supported beneath the center of the cover, a heating system comprising a main flue leading upward through the center of the casing and heater flues leading thence radially outward and loosely through said outlets, a flue for warm air surrounding said main flue and having short branch flues surrounding said heater flues and delivering into the casing, and a cold air flue surrounding said warm air flue and delivering around it below its branches; of an egg tray supported within the casing around said upright flues, and a diaphragm carried by the outermost flue between the center of the egg tray and the warm air branch flues.

13. In an incubator, the combination with a casing having outlets through its sides near its top, a cover therefor, a diaphragm supported beneath the center of the cover, a heating system comprising a main flue leading upward through the center of the casing and heater flues leading thence loosely through said outlets, a flue for warm air surrounding said main flue and having short branch flues surrounding said heater flues and delivering into the casing, and a cold air flue surrounding said warm air flue and delivering around it below its branches; of cleats within the casing, an egg tray supported on said cleats, an upright collar through its center surrounding the outermost of said flues, and a diaphragm carried by the outermost flue between the center of the egg tray and the warm air branch flues.

In testimony whereof I have hereunto subscribed my signature this the fourth day of February, A. D. 1908.

LOUIS N. PORTER.

Witnesses:
C. A. SCHMIDT,
F. W. KENNY, Jr.